March 23, 1954 J. P. ECKERT, JR., ET AL 2,673,293

SIGNAL RESPONSIVE NETWORK

Filed Oct. 21, 1950 4 Sheets-Sheet 1

INVENTORS.
JOHN W. MAUCHLY
JOHN PRESPER ECKERT JR.

BY George V. Eltgroth

ATTORNEY

March 23, 1954 J. P. ECKERT, JR., ET AL 2,673,293

SIGNAL RESPONSIVE NETWORK

Filed Oct. 21, 1950 4 Sheets-Sheet 2

INVENTORS:
JOHN W. MAUCHLY
JOHN PRESPER ECKERT JR.

ATTORNEY

INVENTORS:
JOHN W. MAUCHLY
JOHN PRESPER ECKERT JR.
George V. Eltgroth
ATTORNEY

March 23, 1954 J. P. ECKERT, JR., ET AL 2,673,293

SIGNAL RESPONSIVE NETWORK

Filed Oct. 21, 1950 4 Sheets-Sheet 4

INVENTORS:
JOHN W. MAUCHLY
JOHN PRESPER ECKERT JR.
George V. Eltgroth
ATTORNEY

Patented Mar. 23, 1954 2,673,293

UNITED STATES PATENT OFFICE 2,673,293

SIGNAL RESPONSIVE NETWORK

John Presper Eckert, Jr., Gladwyne, and John W. Mauchly, Ambler, Pa., assignors to Eckert-Mauchly Computer Corporation, Philadelphia, Pa., a corporation of Pennsylvania Application October 21, 1950, Serial No. 191,403

23 Claims. (Cl. 250—27)

This invention relates to apparatus jointly responsive to signal groups arriving over a plurality of channels and more particularly to a signal responsive network of the type delivering at its output a signal reflecting properties present in all its input channels.

This invention provides an apparatus responsive to signals or trains of signals which arrive over a plurality of channels. The apparatus does not respond to each signal individually, but to each group of signals delivered concurrently by the several channels. The output signal or signals produced by the apparatus is determined by the energizing signal group. In this way, the apparatus produces a response which is a signal or train of signals uniquely reflecting the properties of the signals or trains of signals arriving over the signal channels.

Accordingly, it is a principal object of the invention to provide a new and improved signal responsive circuit.

Another object of the invention is to provide a new and improved circuit responsive to signal impulse groups made up of impulses concurrently arriving over a plurality of signal channels.

A further object of this invention is to provide a new and improved circuit responsive to signals concurrently present upon three signal input channels.

Yet another object of the invention is to provide a new and improved circuit for producing unique output signals or impulse trains in response to energizing impulse groups.

Still another object of the invention is to provide an impulse responsive circuit delivering timed output impulses or trains of impulses.

A further object of the invention is to provide an impulse responsive circuit having high reliability and accuracy of response.

Figure 1:
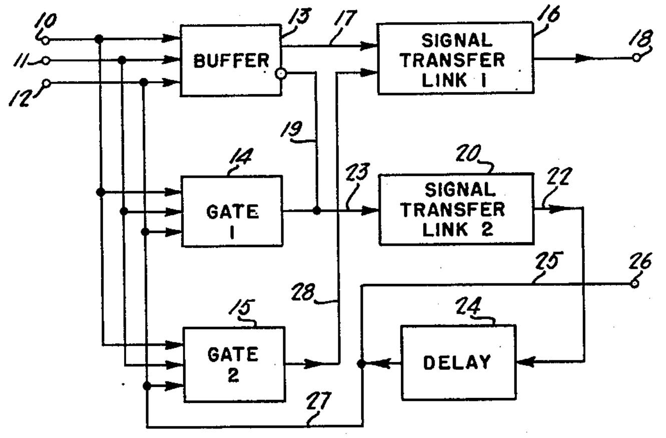
Figure 2:
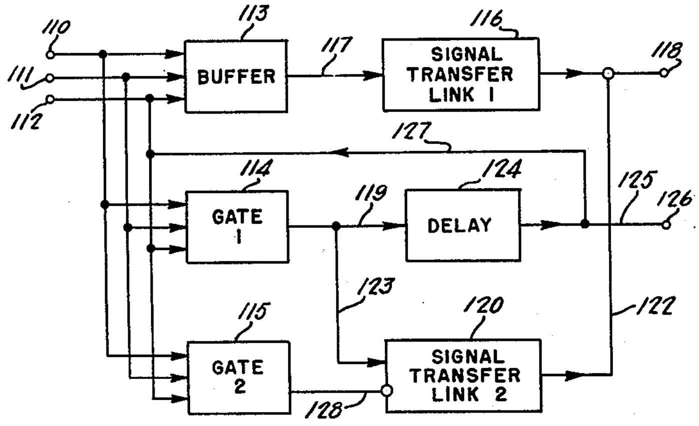
Figure 3:
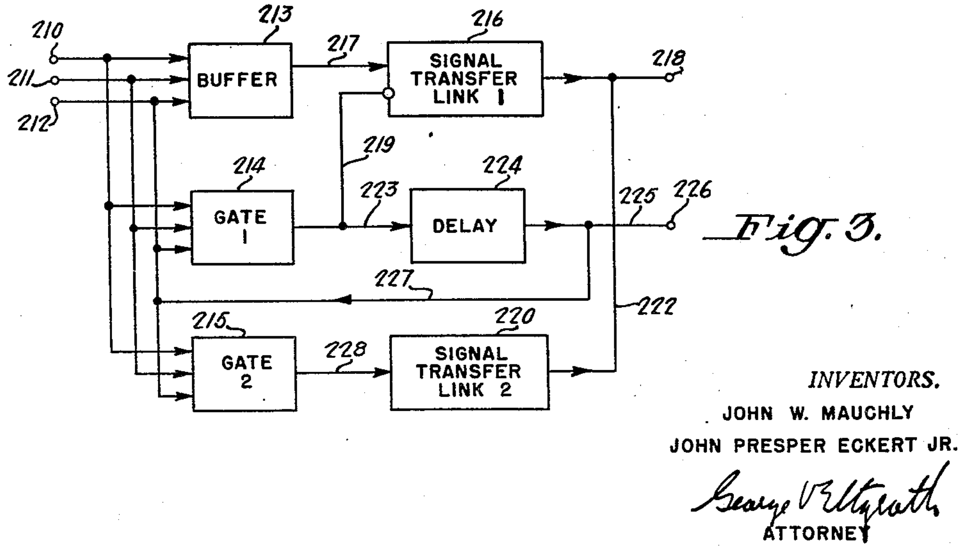
Figures 4, 5:
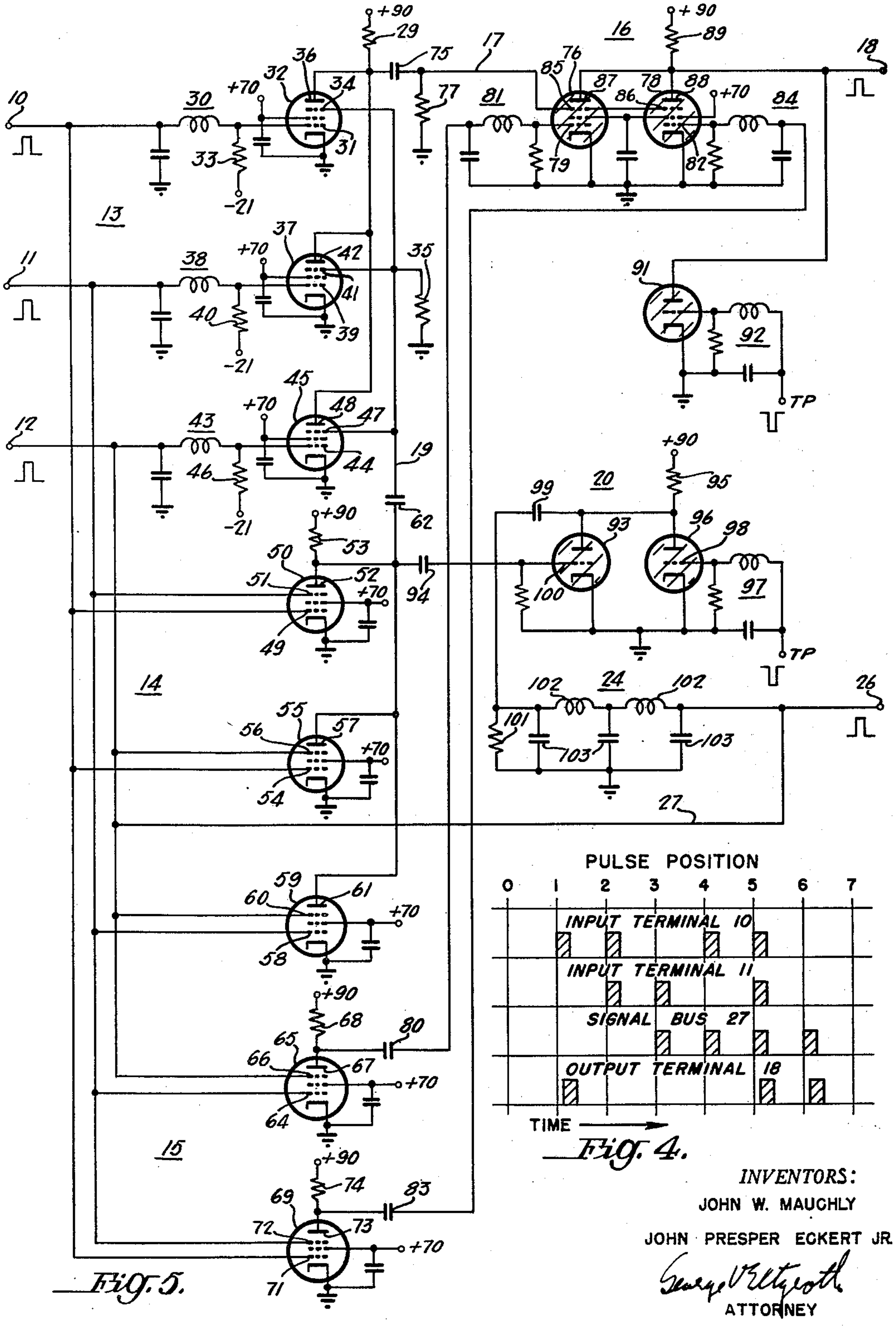

The foregoing and other objects of the invention will become more apparent as the following detailed description of the invention is read in conjunction with the drawings in which:

Figure 1 diagrammatically illustrates in block form a signal responsive network embodying the invention, Figure 2 diagrammatically illustrates in block form a second signal responsive network embracing the invention, Figure 3 diagrammatically illustrates in block form a third signal responsive network including the invention, Figure 4 illustrates in graphic form the signal response of the networks shown in Figures 1, 2, and 3 to input signals.

Figure 6:
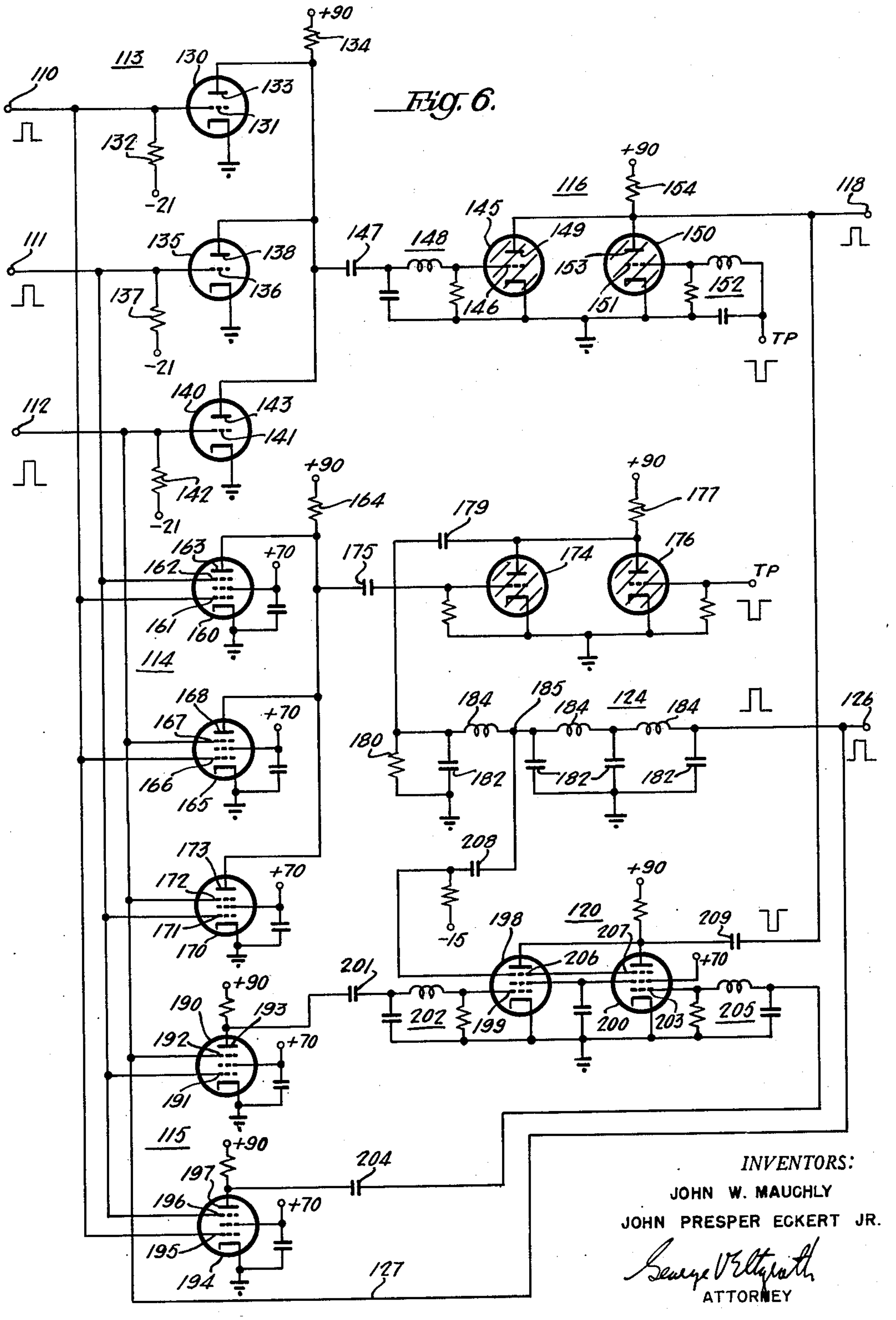
Figure 7:
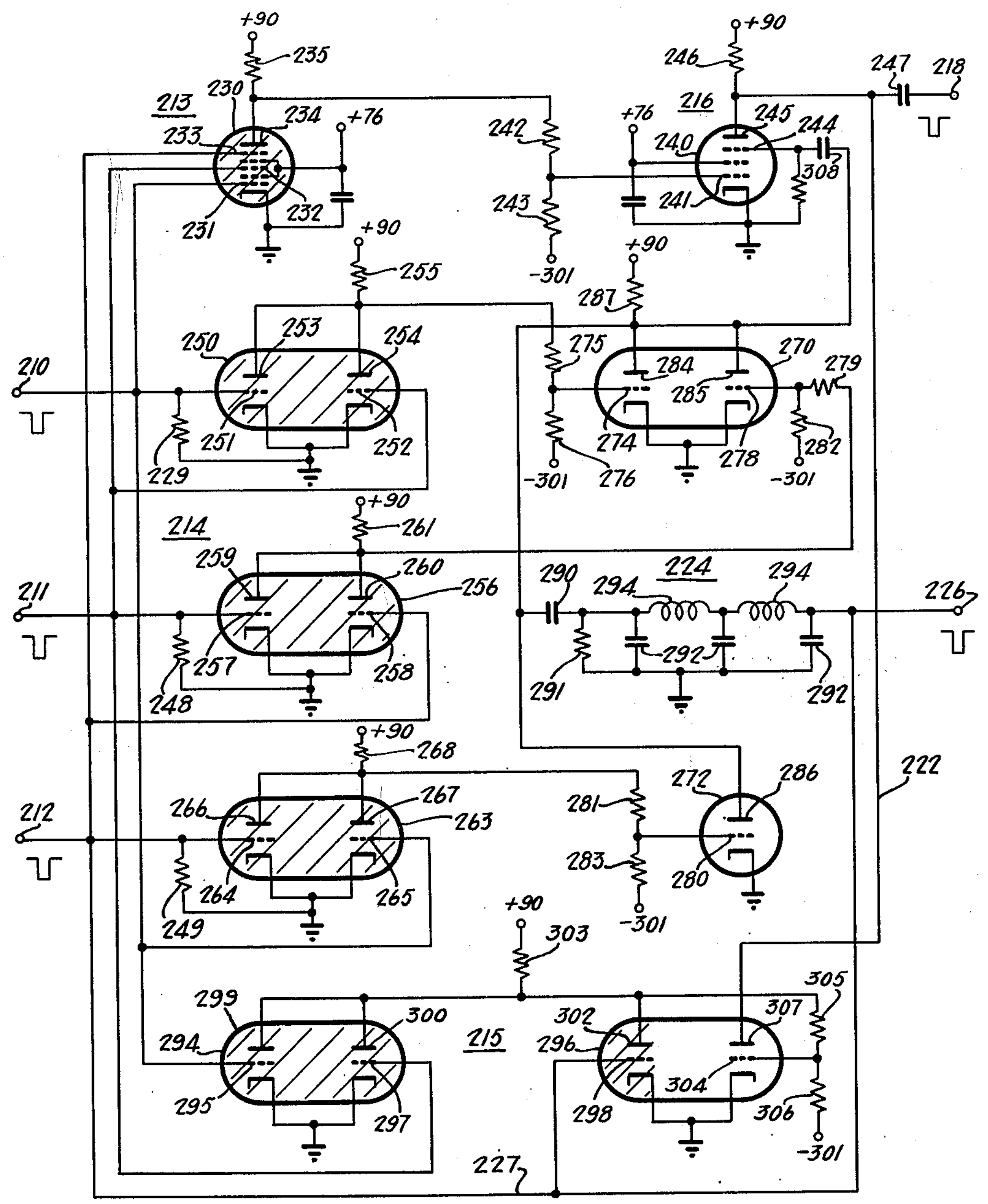

Figure 5 illustrates schematically a signal responsive network conforming to the block diagram shown in Figure 1, Figure 6 illustrates schematically a signal responsive network conforming to the block diagram shown in Figure 2, and Figure 7 illustrates schematically a signal responsive network conforming to the block diagram shown in Figure 3.

In the annexed drawings like parts are identified by like reference characters and values of potential are given for purposes of illustration only and not in order to limit the scope of the invention.

For convenient reference, all supply buses are identified with a number corresponding with their voltage, even numbers being employed for positive voltages, and odd numbers for negative voltages.

Figures 1, 2, and 3 illustrate diagrammatically signal responsive networks characterized by three input channels, and two output channels. For example in Figure 1, the input channels correspond to signal input terminals 10, 11, and 12, and the signal output channels correspond to the signal output terminals 18 and 26. In general, the circuits operate as follows: When an input signal is delivered to but one of the signal input terminals, an output signal is delivered on the first output terminal. When signals are delivered concurrently to two input terminals, the responsive network delivers an output signal on the second output terminal after a predetermined delay. If three signals are delivered concurrently to the three respective input terminals an output signal is delivered on the first output terminal and a predetermined time thereafter an output signal is delivered to the second output terminal.

The predetermined delay imposed upon signals delivered to the second output terminal 26 (Figure 1) is effected by a delay device 24. If the delay is reduced to zero it is evident that the responsive apparatus will operate as follows: As before, delivery of but one signal to the input terminals 10, 11, and 12 delivers an output signal to the output terminal 18. The delivery of two concurrent signals to respective input terminals results in delivery of an output signal upon the second output terminal 26. The delivery of three concurrent signals to the input terminal results in delivery of output signals upon both output terminals 18 and 26.

Figures 1, 2 and 3 show their respective second output terminals (26 of Figure 1) joined to one of their three input terminals (12 of Figure 1) by means of a connecting signal bus (27 of Figure 1). This arrangement is useful when the input channels are to receive impulses or a train of impulses characterized by a predetermined repetition period. In this event two of the input terminals for example 10 and 11, may receive trains of impulse signals at the predetermined repetition rate while the third input terminal 12 derives impulse signals from the output terminal 26 by means of the connecting bus 27. Signals or trains of impulse signals individually delivered to the two input terminals 10 and 11 may be made to bear intelligence by the absence or presence of impulses in given impulse positions within the signal trains. The output of the terminal 18 in this event will also be a signal or train of impulse signals characterized by the same repetition period as the input signals and uniquely determined with reference to presence or absence of impulses given pulse positions, by the intelligence borne by the input signals.

Figure 4 graphically illustrates the output response or train of signal impulses delivered to the output terminal 18 as determined by the respective trains of input impulses to terminals 10 and 11 of Figure 1. Also shown are the time ordered impulse signals delivered by the second output terminal 26 over the signal bus 27 to the third input terminal 12 of Figure 1. Although Figure 1 is referred to in connection with this graph it is to be understood that the response of the other signal responsive networks herein described will be the same for the same input signal trains delivered to their respective input terminals. Time in the graph of Figure 4 is shown to increase directly with pulse position, each pulse position interval corresponding to the repetition rate of the input signal trains.

The delivery of a single impulse to input terminal 10 results in the delivery of a signal over output terminal 18 in pulse position 1.

The presence of two concurrent signals on terminals 10 and 11 in pulse position 2 results in the absence of an output impulse upon terminal 18 in pulse position 2. However, an impulse is delivered after a delay period equivalent to the period of input signals repetition rate from the second output terminal 26 over the signal bus 27 to the third input terminal 12 in pulse position 3.

In this instance again the delivery of two concurrent impulses to the input terminals in pulse position 3 results in the absence of an output signal upon terminal 18 and the delivery of a signal impulse over the signal bus 27 to the third input terminal 12 after a delay of one pulse period.

In pulse position 4 the presence of two input signals likewise results in the absence of an output signal on terminal 18 and delivery of an input signal one pulse period later to the third input terminal 12. This results in the concurrence of three input signals to respective input terminals in pulse position 5 giving rise to a signal over terminal 18 in pulse position 5 and also delivery of an impulse signal to terminal 12 after a pulse position delay (pulse position 6). The absence of impulses to input terminals 10 and 11 in pulse position 6 while an impulse signal is delivered to the input terminal 12 effects a delivery of an output signal over terminal 18 in this pulse position.

In view of Figure 4, the determination of the output signal by the character of the input signals is obvious. In addition to the property of the reference signal responsive networks, which allows output signals determined by the character of the input signals, the characteristic response of these networks make them further useful in connection with apparatus employed for electronic digital computing. This aspect of the invention will be more clearly seen if it is considered that binary numbers may be represented by the absence or presence of impulse signals in given pulse positions. For example the presence of an impulse may be used to designate the numeral 1 (one), while the absence of an impulse in a given pulse position may be utilized to represent the numeral 0 (zero). Thus the signal train delivered to input terminal 10 as illustrated in Figure 4, may represent the binary number 11011, pulse position 1 corresponding to the least significant figure. Likewise, the train of impulses delivered to the input terminal 11 may represent the binary number 10110. The output signal train corresponds to the binary number 110001. By examining the input signals it is obvious that the output signal corresponds to their sum. Because this is so, this responsive apparatus has great utility in operating upon input signals to produce an output signal corresponding to their sum.

Referring now to Figure 1 for a more detailed description, the signal input terminals 10, 11 and 12 are connected to corresponding input leads of a buffer 13, as well as input leads of a gate 14, and the corresponding input leads of a gate 15. If a signal is delivered by but one of the input terminals 10, 11 and 12 to the buffer 13, the buffer 13 delivers a signal to a signal transfer link 16 over a line 17. The signal transfer link 16 in turn delivers a signal to the output terminal 18.

If two signals are concurrently received by any two of the input terminals 10, 11 and 12, the gate 14 is excited inhibiting the delivery of a signal by the buffer 13 through the signal transfer link 16 to the output terminal 18. At the same time gate 14 delivers a signal to the signal transfer link 20 over a line 23. This signal is delivered by the transfer link 20 to the second output terminal 26 over the line 22, a delay device 24 and a line 25. The delay imposed by the device 24 is equivalent to the impulse period of signals delivered to the input terminals. For uses last illustrated by graph 4 the output signal is delivered to the third input terminal 12 by means of a connecting bus 27.

If signals are concurrently delivered to the three input terminals 10, 11 and 12 in addition to the action of the circuit corresponding to two concurrent input signals, the second gate 15 is energized to deliver a signal to the output terminal 18 through the signal transfer link 16.

The operation of the responsive network shown in Figure 2 is as follows: The delivery of but one signal to the three input terminals 110, 111 and 112 results in the delivery of a signal to the output terminal 118 by the signal transfer link 116 which is energized by the buffer through the line 117.

The concurrent presence of two signals upon the input terminals results in the activation of the gate 114 which transfers a signal through the signal transfer link 120 to the output terminal 118. However, the signal transferred by the link 120 is of a character nullifying the signal transferred by link 116 from buffer 113. This results in the absence of an output signal on terminal 118. The gate 114 also delivers a signal through a delay device 124 to the second output terminal 126, and over a connecting bus 127 to the third input terminal 112.

Triple coincidence of signals upon the input terminals results in the activation of a gate 115 which delivers a signal over the line 128 to the signal transfer link 120 inhibiting its signal transfer action. With the absence of a signal delivered to the line 122 the signal delivered by a transfer link 116 energized by buffer 113 is not nullified. This results in also delivering an output signal upon the terminal 118.

Turning now to Figure 3 for an explanation of its operation, the delivery of but one input signal to input terminals 210, 211 and 212 results in the activation of a buffer 213 which delivers a signal through a transfer link 216 over a line 217. The output of the signal transfer link 216 energizes the signal output terminal 218. Two concurrent signals delivered to the input terminals results, also, in the activation of a gate 214 which delivers a signal to the transfer link 216 inhibiting its action. This results in the absence of an output signal upon the output terminal 218. In addition to inhibiting the signal transfer link 216 the gate 214 delivers a signal through the line 223 to the delay 224. The delay interval of the device 224 corresponds to the signal input period. A signal passing through the delay 224 is delivered to the output terminal 226, and by means of a signal bus 227 to the third input terminal 212 for operation in accordance with Figure 4.

Concurrent delivery of signals to each of the input terminals 210, 211 and 212 also results in the activation of gate 215 which delivers a signal over line 228 to the signal transfer link 220. The signal transfer link 220 responds by delivering a signal to the output terminal 218 over line 222. Thus signals are delivered to both output terminals 218 and 226.

It is to be understood that while the figures show a signal bus connecting the second output terminal to the third input terminal of a device for operation in accordance with Figure 4, the responsive networks described may be utilized without such a connection. In such case external input signals may be received by each of the three input terminals. In accordance with the operation of this invention signals may also be derived from both output terminals shown. The apparatus may be further modified by changing the delay period imposed by the delay devices (24 in Figure 1) or allowing the immediate delivery of signals to the second output terminals.

It is obvious that if the apparatus is energized by static input signals the function of the delay device is not of significance and its use is not required.

Refer now to Figure 5 which schematically illustrates a signal responsive circuit conforming to the block representation in Figure 1. This circuit is adapted to receive positive-going impulses over its input terminals 10, 11, and 12 and delivers positive impulses over its output terminals 18 and 26.

The input terminal 10 is connected to the inner control electrode 31 of a buffer valve 32 by means of a delay network 30. The delay network 30 comprises a series inductor and a capacitor connected from the input terminal 10 to ground potential. The buffer valve 32 is normally nonconducting having its inner control electrode 31 returned to a negative potential bus 21 through a grid resistor 33. The buffer valve 32 has its cathode directly grounded, its auxiliary control grid 34 returned to ground through a resistor 35 and its screen electrode linked to positive bus 70 and returned to ground potential through the normal bypass capacitor. The anode 36 of the buffer valve 32 is joined to a positive bus 90 by an anode resistor 29.

The signal input terminal 11 is joined to the inner control electrode 39 of a buffer valve 37 through a delay network 38. Buffer valve 37 is normally nonconducting and has its inner control electrode 39 returned to the negative potential bus 21 and its auxiliary control electrode 41 linked to ground through the resistor 35. The anode 42 of valve 37 is also returned through the anode resistor 29 to the positive bus 90.

The signal input terminal 12 is connected to the inner control electrode 44 of a buffer valve 45 through a delay network 43. The valve 45 is normally nonconducting and has its inner control electrode 44 returned to negative bus 21 through a grid resistor 46, and its auxiliary control electrode 47 returned by the resistor 35 to ground potential. The anode 48 of valve 45 is also returned by the common anode resistor 29 to the positive bus 90.

The receipt of a positive impulse upon any one of the input terminals 10, 11, and 12 results in the respective valves 32, 37, 45 becoming conductive. Conduction of any one of these three valves results in the development of a negative-going signal upon their anodes by the increased voltage drop across the common anode resistor 29.

A gating valve 50 has its inner control electrode 49 connected to terminal 10, its auxiliary control electrode connected to terminal 11, while its screen electrode is linked to the positive bus 70 and bypassed to ground potential by the usual capacitor. The cathode of valve 50 is linked to ground and the anode 52 is returned to positive bus 90 through an anode resistor 53. The gating valve 50 is normally nonconducting and assumes conduction only when positive signals are concurrently present upon its related input terminals 10 and 11.

A second gating valve 55 is also normally nonconducting and has its inner control electrode 54 and auxiliary control electrode 56 respectively connecting to signal input terminals 10 and 12. The anode 57 of gating valve 55 is also returned by means of the anode resistor 53 to positive bus 90. The gating valve 55 becomes conductive only upon the concurrence of positive signals upon the input terminals 10 and 12.

A third gating valve 59 has its control electrodes 58 and 60 respectively connected to signal input terminals 11 and 12. The anode 61 of valve 59 is also connected to the positive bus 90 by the common anode resistor 53. The gating valve 59 is normally nonconducting and becomes conductive only upon the concurrence of positive signals on the signal input terminals 11 and 12.

The anode end of the resistor 53 is connected through a coupling capacitor 62 with the auxiliary control electrodes 34, 41 and 47 respectively of buffer valves 32, 37 and 45.

Whenever two signals appear concurrently on any two of the signal input terminals 10, 11 and 12, a respective one of the gating valves 50, 55 and 59 assumes conduction. This results in the development of a negative-going impulse at the anodes of these valves because of increased voltage drop across the load resistor 53 with increased current flow. This negative impulse is transmitted by the coupling capacitor 62 to the auxiliary control electrodes of the buffer valves 32, 37 and 45 to prevent their conduction. The nonconduction of the buffer valves is assured by the delay networks 30, 38 and 43 respectively associated with them, which when signals appear at the input terminals, delays their arrival upon the inner control electrodes of the buffer valves. This allows the prior arrival of a negative impulse from the gating valves to the auxiliary control electrodes of the buffer valves.

The valve 65 of the pair of signal coincidence valves 65 and 69, is normally nonconducting and has its control electrodes 64 and 66 respectively connected to signal input terminals 11 and 12 and its screen electrode joined to positive bus 70 and returned to ground potential by an ordinary bypass capacitor. The cathode of coincidence valve 65 is linked to ground potential and the anode 67 is returned to positive bus 90 through an anode resistor 68.

The signal coincidence valve 69 is also normally nonconducting and has its control electrodes 71 and 72 respectively connected to the input signal terminals 10 and 11. The anode 73 of this valve 69 is returned to positive bus 90 through an anode resistor 74.

The coincidence valve 65 develops a negative-going signal upon its anode 67 only when positive signals are concurrently present upon the signal input lines 11 and 12. The signal coincident valve 69 likewise develops a negative-going impulse upon its anode 73 when it becomes conductive in response to positive input signals upon the terminals 10 and 11.

A pair of signal input valves 76 and 78 are respectively associated with the signal coincidence valves 65 and 69, as well as with the signal buffer valves 32, 37, and 45.

The signal input valve 76 has its inner control electrode 79 connected with the anode 67 of signal coincidence valve 65 through a coupling capacitor 80 by means of a delay network 81. The signal input valve 76 which is normally conducting has its inner control electrode 79 also returned to ground potential through the ordinary grid resistor while its cathode is directly joined to ground potential and its anode 87 returns to positive bus 90 through anode resistor 89.

The signal input valve 78 which is also normally conducting has its inner control electrode 82 similarly joined to the anode 73 of the signal coincidence valve 69 through a coupling capacitor 83 in series with a delay network 84. The inner control electrode 82 of signal input valve 78 is also returned to ground potential through the usual grid resistor while the cathode is directly linked to ground potential and the anode 88 is returned by the common anode resistor 89 to positive bus 90. The screen electrodes of valves 76 and 78 are linked to the positive bus 70 and returned to ground potential by an ordinary bypass capacitor.

The auxiliary control electrodes 85 and 86 respectively of valves 76 and 78 are both connected by means of a coupling capacitor 75 to the anode end of the resistor 29 which is associated with the buffer valves 32, 42, and 45. The auxiliary control electrodes 85 and 86 of valves 76 and 78 are returned to ground potential through a grid resistor 77.

When any one of the buffer valves 32, 37 and 45 becomes conductive the negative impulse developed by the common resistor 29 is delivered to the auxiliary control electrodes 85 and 86 of valves 76 and 78. This negative signal cuts off both valves 76 and 78 which develops a positive-going signal at the anode end of the common anode resistor 89.

As already noted, when two or more concurrent signals are delivered to the signal input terminals 10 and 11 and 12, the buffer valves 32, 37 and 45 are prevented from delivering an output signal. If three concurrent signals are delivered to each of the input terminals both signal coincidence valves 65 and 69 are rendered conductive. The negative impulses developed in their anode circuits are delivered to a respective one of the signal input valves 76 and 78. This results in both valves 76 and 78 becoming nonconductive, which is the condition prerequisite to the delivery of a positive signal to the output terminal 18.

A signal timing valve 91 associated with the signal input valves 76 and 78 is normally conducting and has its control electrode joined to a timing pulse terminal through a delay network 92 and also returned to ground potential through the usual grid resistor. Signal timing valve 91 has its cathode directly joined to ground potential and its anode returned to positive bus 90 through the common anode resistor 89. It is obvious that as long as the signal timing valve 91 remains conductive a positive signal output will not be developed upon the output terminal 18. By use of valve 91 which is controlled by timing pulses delivered to its control electrode to render it nonconductive, the output signals delivered to terminal 18 are timed. In other that proper timing action be accomplished it is necessary that the signal input valves 76 and 78 both be rendered nonconducting before the signal timing valve 91 is cut off. This is accomplished by use of appropriate delay networks 30, 38 and 43 associated with the buffer valves, and networks 81 and 84 associated with the signal coincidence valves 65 and 69, as well as the delay network 92 associated with the signal timing valve 91. It is noted that the timing pulses delivered to the timing valve 91 are negative signals occurring at a repetition rate equivalent to the repetition rate of input signals.

A signal input valve 93, associated with a signal timing valve 96, has its control electrode 100 connected by a coupling capacitor 94 to the anode end of the anode resistor 53 associated with the gating valves 50, 55 and 59. The signal input valve 93 which is normally conducting has its control electrode 100 returned to ground potential through the ordinary grid resistor, its cathode directly linked to ground potential, and its anode returned through an anode resistor 95 to positive bus 90. The companion timing valve 96 which is also normally conducting receives negative timing pulses upon its control electrode 93 derived through a delay network 97. The timing valve 96 also has its control electrode 98 returned by the ordinary grid resistor to ground potential, while its cathode is directly linked to ground potential and its anode is returned to positive bus 90 through the common anode resistor 95.

The anode end of the resistor 95 is coupled to the input of a delay line 24 through a coupling capacitor 99. The delay line 24 which has its output lead connected to the signal output terminal 26 comprises an input resistor 101 bridged to ground and a plurality of series connected inductors 102 having their junction points returned to ground by means of delay capacitors 103. The delay imposed by the device 24 upon signals passing therethrough is substantially equal to the period of input signals to the signal input terminals.

When at least two signals are concurrently delivered to the input terminals the resulting negative impulse developed by the gating valve anode resistor 53 in addition to inhibiting the operation of the buffer valves delivers a negative input signal to the valve 93 rendering it nonconductive. When the timing valve 96 is also rendered nonconductive soon thereafter due to the delivery of a negative timing pulse, a positive signal is developed by the anode resistor 95. This positive signal is delivered to the delay line 24 and delivered thereby after the appropriate delay interval to the second output terminal 26.

The signal bus 27 connected between the signal output terminal 26 and the signal input terminal 12 results in the delivery of output signals from terminal 26 to this input terminal. Utilization of such connection when signal trains are acted upon by the responsive network has already been discussed in connection with Figures 1, 2 and 3. In that case, signal input trains will be delivered to terminals 10 and 11 while the output signals from terminal 26 will be delivered to the input terminal 12 resulting in action in accordance with Figure 4.

The overall operation of this signal responsive apparatus is as follows: If one signal is delivered to any one of the input terminals, a buffer valve signal is developed which is passed on to the input valves 76 and 78 to render them nonconductive which delivers a positive output signal to the output terminal 18 upon the cutoff of the signal timing valve 91.

If two signals are concurrently present upon any two of the signal input terminals, a negative signal developed in the gating valve circuit is delivered to the buffer valves inhibiting the development of negative pulses in their anode circuit. This results in the absence of a signal over the output terminal 18. The negative impulse developed by the gating circuit is also delivered to the input valve 93 which develops a positive output signal in its anode circuit upon the cutoff of the timing valve 96. Thus after a delay of one pulse period a signal is delivered by the delay line 24 to the output terminal 26. This signal is also delivered at this time to the signal input terminal 12.

In the case where three input signals are concurrently present upon the input terminals, the action of the gating valves is similar to that discussed in the case of two concurrent input pulses. However, in this case, both of the coincidence valves 65 and 69 are activated to deliver negative cutoff signals to the signal input valves 76 and 78. This results in the nonconduction of the input valves and allows the delivery of a positive impulse to the output terminal 18 upon the extinction of the signal timing valve 91. Thus with the concurrent presence of three input signals on the input terminals, a signal is delivered to the output terminal 18 and after the appropriate delay period, is delivered to the output terminal 26.

It is again noted that the network may be used without signal bus 27 providing outputs upon both signal output terminals 18 and 26, while allowing three individual trains of input signals to be delivered to the input terminals 10, 11 and 12. It may be also preferable by those versed in the art to utilize this circuit without the delay imposed by the delay line 24. In this case, the output terminal 26 may be directly connected to the output of the valves 93 and 96.

If signal timing is not desired the timing valves 91 and 96 may also be eliminated.

It may be further desirable to utilize the illustrated responsive network of Figure 5 as a statically responsive network. In this event, it is obvious that the delay elements such as 24, 30, 38, 43, 81, 84, 92 and 97 are without significance. This circuit may be further adapted for static response by replacing the coupling capacitors such as 62, 75, 80, 83, 94, and 99 by direct current circuits as for instance resistance elements. The adaptation of the circuit shown in Figure 5 as a statically responsive circuit having three independent input channels and two output channels is more specifically described and illustrated in the application filed October 21, 1950, in the names of the present inventors, John W. Mauchly and John Presper Eckert, Jr., entitled "Signal Processing Apparatus," Serial No. 191,404.

Refer now to the signal responsive network shown in Figure 6 which conforms to the block diagram shown in Figure 2. Three individual signal input terminals 110, 111 and 112 are provided as well as two signal output terminals 118 and 126. The input terminals are adapted to respond to positive input signals upon terminals 110 and 111 and 112 by delivering time order positive output signals over the output terminals 118 and 126.

Signal input terminal 110 is connected to the control electrode 131 of a buffer valve 130. The buffer valve 130 is normally nonconducting having its control electrode 131 negatively biased by return to a negative bus 21 through a grid resistor 132. The cathode of valve 130 is grounded and the anode 133 is returned to positive bus 90 through an anode resistor 134.

The signal input terminal 111 is connected to the control electrode 136 of a signal buffer valve 135 which is normally nonconducting by having its control electrode 136 negatively biased by return to the negative bus 21 through a grid resistor 137. The anode 138 of buffer valve 135 is also returned through the common anode resistor 134 to positive bus 90.

The signal input terminal 112 is connected to the control electrode 141 of a third signal buffer valve 140 which is also normally nonconducting. The control electrode 141 is negatively biased by its return to negative bus 21 through a grid resistor 142. The anode 143 of valve 140 is also connected through the common anode resistor 134 to positive bus 90.

A normally conducting signal input valve 145 associated with a timing valve 150 has its control electrode 146 connected to the anode end of the buffer valve anode resistor 144 through a coupling capacitor 147 in series with a delay network 148. Delay network 148 comprises a series inductor and an input capacitor connected to ground potential. The control electrode 146 of signal input valve 145 is connected to ground potential through an ordinary grid resistor while its cathode is directly linked to ground and its anode is returned to the positive bus 90 through an anode resistor 154.

The associated signal timing valve 150 receives timing impulses upon control electrode 151 through a delay network 152. Valve 150 also has its control electrode 151 returned to ground potential through an ordinary grid resistor, its cathode directly linked to ground potential, and its anode 153 returned through the common anode resistor 154 to positive bus 90. The anodes 149 and 153 of valves 140 and 150 are also linked to the signal output terminal 118.

If a positive signal appears upon any one of the input terminals 110, 111 and 112, a respective buffer valve becomes conductive. This develops a negative-going signal on the anodes joining the common resistor 134 which is transmitted to the signal input valve 145 resulting in its cutoff. When the signal timing valve 150 is also cut off by the arrival of a negative timing pulse at its input, a positive-going signal is normally developed across the common anode resistor 154 which is delivered to the output terminal 118. As explained in connection with Figure 5, the repetition rate of negative timing pulse signals is the same as the repetition rate of input signals delivered to the input terminals.

A first signal gating valve 160, which is normally nonconducting, has its control electrodes 161 and 162 respectively connected to the signal input terminals 110 and 111. The cathode of valve 160 is directly grounded, while the screen electrode is returned to ground by an ordinary bypass capacitor and linked to a positive potential bus 70. The anode 163 of valve 160 is maintained positive by return to bus 90 through an anode reisstor 164.

A second signal gating valve 165 also has its anode 168 returned through the anode resistor 164 to positive bus 90 while its control electrodes 166 and 167 are respectively connected to signal input terminals 110 and 112.

A third signal gating valve 170 likewise has its anode 173 returned through the common anode resistor 164 to a positive bus 90 and its control electrodes 171 and 172 respectively returned to signal input terminals 111 and 112.

The signal gating valves 160, 165, and 170 are normally nonconducting and become conductive only in the event positive signals are concurrently present on both of their control electrodes. Conduction of a signal gating valve 160, 165, 170 results in the development of a negative-going impulse on their anodes by the common anode resistor 164.

A normally conducting signal coupling valve 174 associated with a signal timing valve 176, has its control electrode connected with the anode end of the gating anode resistor 164 through a coupling capacitor 175. The control electrodes of valves 174 and 176 are returned to ground potential through respective grid resistors and have their cathodes directly joined to ground. Signal timing valve 176 derives a signal upon its control electrode from a timing pulse terminal delivering negative impulses at the repetition rate already described. The anodes of valves 174 and 176 are both returned through a common anode resistor 177 to positive bus 90 and linked through a capacitor 179 and a series delay line 120 to the signal output terminal 126.

The signal delay line 120 is comprised of an input resistor 180 connected to ground and series inductors 184 returned to ground potential at their junction points through associated delay capacitors 182. The delay line 120 imposes a delay upon signals transmitted therethrough substantially equivalent to the period corresponding to the period of input signals delivered to the input terminals of the responsive network.

In operation, it is obvious that when at least two concurrent positive impulses are received by the signal input terminals 110, 111 and 112 at least one signal gating valve 160, 165, 170 will be rendered conductive and develop a negative-going output signal. This negative impulse is delivered to the normally conductive coupling valve 174 rendering it nonconductive. A positive timed signal is developed on the anodes of valves 174 and 176 upon the cutoff of the normally conducting timing valve 176 with the arrival of negative timing pulse. This positive signal is delivered by means of a delay line 124 to the signal output terminal 126. However, this signal arrives after a delay of approximately a signal pulse period. It is noted that the output signal on terminal 126 is also delivered to the input signal terminal 112 by means of the connecting signal bus 127.

A signal coincidence valve 190 which is normally nonconducting has its control electrodes 191, 192 respectively connected with the input signal terminals 111 and 112 while its cathode is directly grounded, and its screen electrode is returned to ground by the usual bypass capacitor and linked to positive bus 70. The anode 193 of signal coincidence valve 190 is maintained positive by return to positive bus 90 through an anode resistor.

Signal coincidence valve 190 is rendered conductive only when positive signals are concurrently received by both of its input control electrodes.

Similarly, a second signal coincidence valve 194 which is normally nonconducting has its control electrodes 195 and 196 respectively connected to the input terminals 110 and 111. The anode 197 of valve 194 is returned to the positive potential bus 90 through an anode resistor. Signal coincidence valve 194 also requires concurrent positive signals upon its input electrode to render it conducting.

A pair of parallel connected signal input valves 198 and 200 are each respectively responsive to the output signals from the signal coincidence valves 190 and 194 as well as jointly responsive to positive impulses derived from the signal gating valves 160, 165 and 170.

The inner control electrode 199 of signal input valve 198 is connected to the anode 193 of signal coincidence valve 190 through a coupling capacitor 201 and the series connected delay network 202. The inner control electrode 203 of signal input valve 200 is connected to the anode 197 of signal coincidence valve 194 through a coupling capacitor 204 and a series connected delay network 205. The input control electrodes 199 and 203 of signal input valves 198 and 200 are respectively returned to ground potential through the usual grid resistors while their cathodes are directly grounded and their screen electrodes are joined to ground through the usual bypass capacitor and linked to the positive potential bus 70.

The auxiliary control electrodes 206 and 207 of signal input valves 198 and 200 are both connected to a tap 185 of the signal delay line 124 through a coupling capacitor 208. The control electrodes 206 and 207 are further returned to a negative biasing potential bus 15 through the usual grid resistor rendering respectively the valves 198 and 200 normally nonconducting.

Continuing the consideration of the responsive circuit when two concurrent input signals are delivered to the input terminals, a positive signal derived from the tap 185 of delay line 124 is delivered to the normally nonconducting valves 198 and 200 rendering them both conductive. This develops a negative-going impulse signal upon the anodes of valves 198 and 200 which is delivered through the coupling capacitor 209 to the signal output terminal 118. It is noted that the signal delivered by the signal input valves 198 and 200 is of opposite polarity from the signal delivered by the signal input and signal timing valves 145 and 150. This results in effectively preventing the delivery of a positive-going impulse to the signal output terminal 118. The simultaneous arrival of positive and negative signals upon the terminal 118 preventing the delivery of a positive output signal is achieved by properly adjusting the delay network 148 associated with the signal input valve 145 and the signal delay tap 185 of signal delay line 124 associated with the signal input valves 198 and 200.

In the case where three impulses are delivered concurrently arriving over all input terminals 110, 111, and 112 both of the signal coincidence valves 190 and 194 are rendered conductive developing negative signals in their circuits. These negative signals are respectively delivered to the signal input valves 198 and 200 preventing the conduction of either one of these valves in response to a positive signal delivered to their respective auxilliary control electrodes 206 and 207. It is noted that the delivery of negative impulses to the inner control electrodes of both valves 198 and 200 is necessary in order to prevent the development of a negative impulse in their anode circuits. This is because of the conduction of either one of these valves in response to a positive signal delivered to their respective auxiliary control electrodes 206 and 207. It is noted that the delivery of negative impulses to the inner control electrodes of both valves 198 and 200 is necessary in order to prevent the development of a negative impulse in their anode circuits. This is because of the conduction of either one of signal input valves 198, 200 will allow the development of said negative impulse. The arrival of the negative signals upon the inner control electrodes of said valves 198 and 200 at the proper time to be effective is provided by the delay networks 202 and 205 respectively. Thus negative inhibiting signals arrive at the valves 198 and 200 before a positive pulse from the delay line 124 allows them to assume their conductive state. With the development of a negative signal by valves 190 and 194, the valves 198 and 200 are inhibited and the positive signal developed by the valves 145 and 150 is effectively delivered to the signal output terminal 118.

Summarizing the operation of the responsive circuit shown in Figure 6, delivery of a positive signal to one of the input terminals results in the delivery of an output signal over the terminal 118. The delivery of two concurrent positive signals to the input terminals of this device results in the activation of the gating valves 160, 165, 170 which delivers a positive-going signal to the output terminal 126 after an appropriate delay period and also delivers this delay signal to the input terminal 112. A positive signal upon output terminal 118 is prevented by the gating valves causing the delivery of a positive signal to the input valves 198 and 120 which results in the delivery of a negative-going signal to the output terminal 118. This counteracts the positive signal derived from valves 145 and 150. When three concurrent positive signals are delivered to the input lines, the action of the responsive network is similar to that explained in connection with two concurrent input signals except that the signal input valves 198 and 200 are inhibited so that an output signal is delivered to the output terminal 118 as well as to the output terminal 126 after an appropriate delay period. The action of the responsive circuit has been explained as adapted to receive trains of impulse signals upon two of its input terminals while the third input terminal derives signals from the second output terminal 126 for response in accordance with the graphic representation of Figure 4.

As stated in connection with Figure 5 the circuit of Figure 6 may be utilized without the connecting signal bus line 127. The circuit may be also adapted for response to static input signals by supplying appropriate direct current couplings in place of capacitor couplings.

Refer now to Figure 7 which is a signal responsive circuit within the scope of the block diagram shown in Figure 3. This circuit has three signal input terminals 210, 211 and 212 adapted to receive negative signals and two signal output terminals 218 and 216 delivering negative-going output signals. Each signal input terminal 210, 211 and 212 is respectively connected to a control electrode 231, 232 and 233 of a normally conducting buffer valve 230. Each of the signal input terminals 210, 211 and 212 is also respectively returned by grid resistors 229, 248 and 249 to ground potential. The cathode of buffer valve 230 is directly returned to ground, the screen electrode is grounded by an ordinary bypass capacitor and directly linked to positive bus 76, and the anode 234 is returned to positive bus 90 through an anode resistor 235.

A normally nonconducting output control valve 240 has its inner control electrode 241 connected to the anode 234 of the signal buffer valve 230 by means of a coupling resistor 242. Said grid 241 is negatively biased by returning through a grid resistor 243 to negative potential bus 301. The auxiliary control electrode 244 of output control valve 240 is returned to ground potential through an ordinary grid resistor, the cathode is directly returned to ground potential and the screen electrode is bypassed by ground through the usual capacitor and linked to positive bus 70. Valve 240 has its anode 245 returned to positive bus 90 through anode resistor 246 and connected to the signal output terminal 218 through a coupling capacitor 247.

The delivery of a negative signal to any one of the signal input terminals 210, 211 and 212 results in the cutoff of the signal buffer valve 230 and the development of a positive signal in its anode circuit. This positive signal is transmitted to the normally nonconducting output control valve 240 rendering it conductive. This results in the production of a negative-going signal in the anode circuit of valve 240 which is transmitted to the signal output terminal 218.

This action of the output control valve 240 is effected only when the normal voltage is present upon the auxiliary control electrode 244. The delivery of a negative impulse to the control electrode 244 of valve 240 preventing its conduction will be considered later.

A dual section gating valve 250 has the control electrodes 251, 252 of each section respectively connected with signal input terminals 210 and 211. The cathodes of gating valve 250 are joined to ground potential while the anodes 253 and 254 are both returned through a common anode resistor 255 to positive bus 90. Both sections of gating valve 250 are normally conducting, each section respectively being cut off with the presence of a negative signal upon the respective signal input terminals 210, 211. It is noted, however, that a positive signal is developed on the anodes 253, 254 only when both sections of gating valve 250 are concurrently nonconducting.

A dual section gating valve 256 has the control electrodes 257, 258 of each section respectively connected with the signal input terminals 211 and 212. Gating valve 256 has its cathodes directly grounded and its anodes 259 and 260 both returned through a common anode resistor 261 to positive bus 90. Gating valve 256 is normally conducting. The positive signal is developed on the anodes 259, 260 only with the concurrent presence of negative signals on input terminals 211 and 212.

A dual section signal gating valve 263 has the control electrodes 264, 265 of each section respectively connected with the signal input terminals 212 and 210. The cathodes of gating valve 263 are directly linked to ground potential while the anodes 266 and 267 are both returned through a common anode resistor 268 to positive bus 90. The gating valve 263 is normally conducting and develops a positive-going signal on its anodes 266 and 267 only when negative signals are concurrently applied to the signal input terminals 212 and 210.

A dual section coupling valve 270 and a single section coupling valve 272 are respectively associated with the signal gating valves 250, 256 and 263. Note that the coupling valves 270 and 272 are normally nonconducting. The control electrodes 274, 278 and 280 are respectively connected to the anodes of gating valves 250, 256 and 263 through related coupling resistors 275, 279 and 281. Each of the control electrodes of coupling valves 270 and 272 are negatively biased by returning through respective grid resistors 276, 282 and 283 to negative bus 301. The anodes 284, 285 and 286 of coupling valves 270 and 272 are returned by a common anode resistor 287 to positive bus 90 while their related cathodes are directly returned to ground potential.

Conduction is assumed by a coupling valve section when its associated control electrode 274, 278, 280 receives a positive signal from respective cutoff dual gating valves 253, 256, and 263. The conduction of any valve section of coupling valves 270 and 272 is sufficient to develop a negative-going signal on the anodes joined to the common anode resistor 287. This negative-going signal is transmitted to the signal output terminal 226 by means of a coupling capacitor 290 connected to the anode end of the resistor 287 and a delay line 224 connected between said coupling capacitor 290 and the signal output terminal 226.

The delay line 224 is comprised of an input resistor 291 bridged to ground potential and series inductors 294 having their junction points returned to ground potential by delay line capacitors 292.

Figure 7 also illustrates the connection of signal output terminal 226 with the signal input terminal 212 by means of a signal bus 227, for operation in accordance with Figure 4. For operation in accordance with Figure 4, the delay line 224 is also characterized by a delay interval equivalent to the period corresponding to the impulse repetition rate of signals delivered to the input terminals.

The anodes of the coupling valves 270 and 272 associated with the common resistor 287 are also connected to the auxiliary control electrode 244 of the output control valve 240 by means of a coupling capacitor 308. Thus, when a negative signal is developed across the anode resistor 287, it is delivered to the auxiliary control electrode 244 of the output control valve 240 preventing its conduction.

A signal coincidence gate circuit 215 is comprised of a dual section coincidence valve 299 and one section of a dual valve 296 which have control electrodes 295, 297 and 298 respectively connected to the signal input terminals 210, 211, and 212. The three associated anode structures of the signal coincidence circuit 215 are normally conducting and have their cathodes returned to ground while their anodes 299, 300 and 302 are all returned by a common anode resistor 303 to positive bus 90.

The anode end of the common resistor 303 is connected to the control electrode 304 in the right hand section of the dual valve 296 referred to as the signal inverting section through a coupling resistor 305. The signal inverting section of valve 296 is normally nonconducting and has its control electrode 304 biased negatively by its return to negative bus 301 through a grid resistor 306. The anode 307 of the signal inverting section of valve 296 is connected to bus 90 through the anode resistor 246 also associated with the output control valve 240.

It is noted that only upon the concurrent presence of negative signals upon the signal input terminals 210, 211 and 212 is a positive signal developed upon the anodes of the coincidence circuit 215. This is because conduction of any one of the anode structures in the valves 299 and 296 associated in the coincidence circuit 215 draws current through the anode resistor 303 and prevents a decrease in voltage drop across it.

However, when a positive signal is developed in the anode circuit in the coincidence network 215, it is delivered to the signal inverting valve section of valve 296 resulting in its conduction. This conduction causes current flow through the anode resistor 246 producing a negative-going signal which is delivered to the output terminal 218.

Briefly summarizing the operation of the circuit shown in Figure 7, the presence of a single negative signal on one of the input terminals 210, 211 and 212 results in the cutoff of the signal buffer valve 213, the delivery of a positive signal to the output control valve 240, and the delivery of a negative signal to the output terminal 218.

When two concurrent negative signals are received over the signal input terminals, a related one of the dual signal gating valves 250, 256, 263 is rendered nonconductive delivering a positive signal to its associated coupling valves 270 and 272. This results in a current surge through the common coupling valve anode resistor 287 developing a negative-going impulse which is delivered to the output control valve 240 preventing its conductivity. This prevents the delivery of a negative-going signal over the output terminal 218. However, the negative signal developed across the anode resistor 287 is also delivered to the signal line 224 and results in its impression upon the signal output terminal 226 after an appropriate delay interval. The connecting signal bus 227 also effects the delivery of this negative-signal to the input terminal 212.

When three negative signals are concurrently presented to signal input terminals 210, 211 and 212, in addition to the operation of the circuit as described for one and two concurrent signals delivered to the apparatus, a positive signal is also developed on the anodes connected to the common resistor 303 of the coincidence circuit 215 resulting in the conductivity of the signal inverting valve section 296. This results in a current surge through the anode resistor 246 and the delivery of a negative signal to the output terminal 218. Thus, not only is an appropriate delay signal delivered to the terminal 226, but a negative signal is also delivered to the terminal 218.

It is to be understood that while Figure 7 shows a signal bus 227 connecting the output terminal 226 to the input terminal 212, this responsive circuit may also be utilized without such a connection. In that case, external signals may be received by each of the three input terminals. The delay interval imposed by the line 224 may also be varied, or the apparatus may be used without the line 224.

The circuit shown in Figure 7 may also be adapted for static response to static input signals by replacing coupling capacitors such as 247, 290 and 308 by appropriate direct coupling elements or resistances.

While only a few representative embodiments of apparatus for practising the invention disclosed herein have been outlined in detail, there will be obvious to those skilled in the art, many modifications and variations accomplishing the foregoing objects and realizing many or all of the advantages, but which yet do not depart essentially from the spirit of the invention.

What is claimed is:

1. In combination; first, second and third signal lines; a buffer device comprising first, second and third input conductors adapted to respectively receive stimuli from said lines, and an output conductor; a first signal output link energized by the output conductor of said buffer device; a first gating circuit comprising first, second and third input conductors adapted to respectively receive stimuli from said signal lines, and an output conductor; a connection between said first gating circuit output conductor and said buffer device; said first gating circuit upon the concurrence of stimuli upon any two of said signal lines energizing said gating circuit output conductor and inhibiting stimulation of the output conductor of said buffer device; a second signal output link energized by the output conductor of said first gating circuit; a delay element connected between the second signal output link and the third signal line; and a second gating circuit comprising first, second and third input conductors adapted to respectively receive stimuli from said signal lines, and an output conductor connected to said first signal output link; said second gating circuit upon the concurrence of stimuli upon each of said signal lines energizing said first signal output link.

2. In combination; first, second, and third signal lines; a buffer device comprising first, second and third input conductors adapted to respectively receive stimuli from said lines, and an output conductor; a first signal output link energized by the output conductor of said buffer device; a first gating circuit comprising first, second and third input conductors adapted to respectively receive stimuli from said signal lines, and an output conductor; a connection between said first gating circuit output conductor and said buffer device; said first gating circuit upon the concurrence of stimuli upon any two of said signal lines energizing said gating circuit output conductor and inhibiting stimulation of the output conductor of said buffer device; a second signal output link energized by the output conductor of said first gating circuit; and a second gating circuit comprising first, second and third input conductors adapted to respectively receive stimuli from said signal lines, and an output conductor connected to said first signal output link; said second gating circuit upon the concurrence of stimuli upon each of said signal lines energizing said first signal output link.

3. In combination; first, second, and third signal lines; a buffer device comprising first, second and third input conductors adapted to respectively receive stimuli from said lines, and an output conductor; a first signal output link conditionally passing stimuli and energized by the output conductor of said buffer device; a first gating circuit comprising first, second and third input conductors adapted to respectively receive stimuli from said signal lines, and an output conductor; a connection between said first gating circuit output conductor and said buffer device; said first gating circuit upon the concurrence of stimuli upon any two of said signal lines energizing said gating circuit output conductor and inhibiting stimulation of the output conductor of said buffer device; a second signal output link conditionally passing stimuli and energized by the output conductor of said first gating circuit; a signal source conditioning said first and second signal output links for signal passage; and a second gating circuit comprising first, second and third input conductors adapted to respectively receive stimuli from said signal lines, and an output conductor connected to said first signal output link; said second gating circuit upon the concurrence of stimuli upon each of said signal lines energizing said first signal output link.

4. In combination; first, second and third signal lines; a buffer device comprising first, second and third input conductors adapted to respectively receive stimuli from said lines, and an output conductor; a signal output link energized by the output conductor of said buffer device; a first gating circuit comprising first, second and third input conductors adapted to respectively receive stimuli from said signal lines, and an output conductor; a connection between said first gating circuit output conductor and said buffer device; said first gating circuit upon the concurrence of stimuli upon any two of said signal lines energizing said output conductor and inhibiting stimulation of the gating circuit output conductor of said buffer device; a delay element having an input lead connected with the output lead of said first gating circuit and an output lead; and a second gating circuit comprising first, second and third input conductors adapted to respectively receive stimuli from said signal lines, and an output conductor connected to said first signal output link; said second gating circuit upon the concurrence of stimuli upon each of said signal lines energizing said first signal output link.

5. In combination; first, second and third signal input lines; first, second and third buffer valves, each comprising a first control electrode, a second control electrode and an output electrode; first, second and third delay elements respectively connected between said first, second and third signal input lines and the first control electrodes of said first, second and third buffer valves; first and second signal output valves each having a first control electrode connected to the output electrodes of said buffer valves, a second control electrode, and an output electrode; a first signal output line connected to the output electrodes of said signal output valves; first, second and third gating valves, each comprising first and second control electrodes respectively connected with two of said signal input lines in differing combinations, and an output electrode; a connection between the second control electrodes of said buffer valves and the output electrodes of said gating valves; a second signal output line connected to the output electrode of said gating valves; a first coincidence valve comprising first and second control electrodes respectively connected to the first and second signal input lines, and an output electrode connected with the second control electrode of said first signal output valve; and a second coincidence valve comprising first and second control electrodes respectively connected to the second and third signal input lines, and an output electrode connected to the second control electrode of said second signal output valve.

6. In combination; first, second and third signal input lines; a buffer device comprising first, second and third input conductors adapted to respectively receive stimuli from said lines, and an output conductor; a signal output line; a first signal transfer connection between the output conductor of said buffer device and said signal output line; a first gating circuit comprising first, second and third input conductors adapted to respectively receive stimuli from said signal input lines, and an output conductor; said first gating device upon the concurrence of stimuli upon any two of said signal input lines energizing said first gating circuit output conductor; a delay element having an input lead connected with the output conductor of said first gating circuit, and an output lead; a connection between the output lead of said delay element and said third signal input line; a second signal transfer connection energized by the output conductor of said first gating circuit to inhibit stimulation of said signal output line; and a second gating circuit comprising first, second and third input conductors adapted to receive stimuli from said signal lines, and an output conductor connected to said second signal transfer connection; said second gating circuit upon the concurrence of stimuli upon each of said signal lines energizing said second gating circuit output conductor and inhibiting said second signal transfer connection.

7. In combination; first, second and third signal input lines; a buffer device comprising first, second and third input conductors adapted to respectively receive stimuli from said lines, and an output conductor; a signal output line; a first signal transfer connection between the output conductor of said buffer device and said signal output line; a first gating circuit comprising first, second and third input conductors adapted to respectively receive stimuli from said signal input lines, and an output conductor; said first gating device upon the concurrence of stimuli upon any two of said signal input lines energizing said first gating circuit output conductor; a delay element having an input lead connected with the output conductor of said first gating circuit, and an output lead; a second signal transfer connection energized by the output conductor of said first gating circuit to inhibit stimulation of said signal output line; and a second gating circuit comprising first, second and third input conductors adapted to receive stimuli from said signal lines, and an output conductor connected to said second signal transfer connection; said second gating circuit upon the concurrence of stimuli upon each of said signal lines energizing said second gating circuit output conductor and inhibiting said second signal transfer connection.

8. In combination; first, second and third signal input lines; a buffer device comprising first, second and third input conductors adapted to respectively receive stimuli from said lines, and an output conductor; a first signal output line; a first signal transfer connection between the output conductor of said buffer device and said first signal output line; a first gating circuit comprising first, second and third input conductors adapted to respectively receive stimuli from said signal input lines, and an output conductor; said first gating device upon the concurrence of stimuli upon any two of said signal input lines energizing said first gating circuit output conductor; a second signal output line connected to the output conductor of said first gating circuit; a second signal transfer connection energized by the output conductor of said first gating circuit to inhibit stimulation of said first signal output line; and a second gating circuit comprising first, second and third input conductors adapted to receive stimuli from said signal lines, and an output conductor connected to said second signal transfer connection; said second gating circuit upon the concurrence of stimuli upon each of said signal lines energizing said second gating circuit output conductor and inhibiting said second signal transfer connection.

9. In combination; first, second and third signal input lines; first, second and third buffer valves each comprising a control electrode respectively connected to one of said signal input lines, and an output electrode; first and second signal output lines; a first delay element connected between the output electrodes of said buffer valves and said first signal output line; first, second and third gating valves each comprising first and second control electrodes respectively connected with two of said signal input lines in differing combinations, and an output electrode connected to said second signal output line; a first coincidence valve comprising first and second control electrodes respectively connected to said first and second signal input lines, and an output electrode; a second coincidence valve comprising first and second control electrodes respectively connected to said second and third signal input lines, and an output electrode; first and second signal input valves each having an output electrode connected to said first signal output line, a first control electrode connected to the output electrode of a respective one of said coincidence valves, and a second control electrode; and a delay element connected between the output electrodes of said gating valves and the second control electrodes of said first and second signal input valves.

10. In combination; first, second and third signal input lines; a buffer device comprising first, second and third input conductors adapted to respectively receive stimuli from said lines, and an output conductor; a signal output line; a first signal transfer connection between the output conductor of said buffer device and said signal output line; a first gating circuit comprising first, second and third input conductors adapted to respectively receive stimuli from said signal input lines, and an output conductor; a connection between said first gating circuit output conductor and said first signal transfer connection; said first gating device upon the concurrence of stimuli upon any two of said signal input lines energizing said output conductor and inhibiting said first signal transfer connection; a delay element having an input lead connected with the output conductor of said first gating circuit, and an output lead; a connection between the output lead of said delay element and said third signal input line; a second gating circuit comprising first, second and third input conductors adapted to receive stimuli from said signal input lines, and an output conductor; said second gating circuit upon the concurrence of stimuli upon each of said signal input lines energizing its output conductor; and a second signal transfer connection between the output conductor of said second gating circuit and said output signal line.

11. In combination; first, second and third signal input lines; a buffer device comprising first, second and third input conductors adapted to respectively receive stimuli from said lines, and an output conductor; a signal output line; a first signal transfer connection between the output conductor of said buffer device and said signal output line; a first gating circuit comprising first, second and third input conductors adapted to respectively receive stimuli from said signal input lines, and an output conductor; a connection between said first gating circuit output conductor and said first signal transfer connection; said first gating device upon the concurrence of stimuli upon any two of said signal input lines energizing said output conductor and inhibiting said first signal transfer connection; a delay element having an input lead connected with the output conductor of said first gating circuit, and an output lead; a second gating circuit comprising first, second and third input conductors adapted to receive stimuli from said signal input lines, and an output conductor; said second gating circuit upon the concurrence of stimuli upon each of said signal input lines energizing its output conductor; and a second signal transfer connection between the output conductor of said second gating circuit and said output signal line.

12. In combination; first, second and third signal input lines; a buffer device comprising first, second and third input conductors adapted to respectively receive stimuli from said lines, and an output conductor; a first signal output line; a first signal transfer connection between the output conductor of said buffer device and said first signal output line; a first gating circuit comprising first, second and third input conductors adapted to respectively receive stimuli from said signal input lines, and an output conductor; a connection between said first gating circuit output conductor and said first signal transfer connection; said first gating device upon the concurrence of stimuli upon any two of said signal input lines energizing said output conductor and inhibiting said first signal transfer connection; a second signal output line connected to the output conductor of said first gating circuit; a second gating circuit comprising first, second and third input conductors adapted to receive stimuli from said signal input lines, and an output conductor; said second gating circuit upon the concurrence of stimuli upon each of said signal input lines energizing its output conductor; and a second signal transfer connection between the output conductor of said second gating circuit and said first output signal line.

13. In combination; first, second and third signal input lines; a buffer valve comprising first, second and third control electrodes respectively connected with said signal input lines; an output valve having a first control electrode connected to the output electrode of said buffer valve, a second control electrode, and an output electrode; a first output line connected with the output electrode of said output valve; first, second and third coupling valves each having an output electrode connected to the second control electrode of said output valve, and a control electrode; first, second and third pairs of gating valves each pair having output electrodes connected to a respective control electrode of said coupling valves, and a pair of control electrodes each respectively connected with two of said signal input lines in differing combination pairs; a second output line connected to the output electrodes of said coupling valves; first, second and third coincidence valves each having a control electrode connected to respective ones of said signal input lines, and an output electrode; and a signal inverting valve comprising a control electrode connected to the output electrodes of said coincidence valves, and an output electrode connected to said first output line.

14. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and energizing said second output conductor; means connected to said input conductors responsive to stimuli on each of said input conductors securing energization of said first output conductor; and an additional connection between the second output conductor and the third input conductor of said circuit.

15. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and energizing said second output conductor; means connected to said input conductors responsive to stimuli on each of said input conductors securing energization of said first output conductor; and a delay element having an input lead connected with the second output conductor of said circuit and an output lead.

16. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and energizing said second output conductor; means connected to said input conductors responsive to stimuli on each of said input conductors securing energization of said first output conductor; a delay element having an input lead connected with the second output conductor of said circuit and an output lead; and a connection between the output lead of said delay element and the third input conductor of said circuit.

17. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and a predetermined time thereafter energizing said second output conductor; means connected to said input conductors responsive to stimuli on each of said input conductors securing energization of said first output conductor; and an additional connection between the second output conductor and the third input conductor of said circuit.

18. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and a predetermined time thereafter energizing said second output conductor; means connected to said input conductors responsive to stimuli on each of said input conductors securing energization of said first output conductor; and a delay element having an input lead connected with the second output conductor of said circuit and an output lead.

19. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and a predetermined time thereafter energizing said second output conductor; means connected to said input conductors responsive to stimuli on each of said input conductors securing energization of said first output conductor; a delay element having an input lead connected with the second output conductor of said circuit and an output lead; and a connection between the output lead of said delay element and the third input conductor of said circuit.

20. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and energizing said second output conductor; means connected to said input conductors responsive to stimuli on each of said input conductors securing energization of said first output conductor; a gating device conditionally passing stimuli comprising a first input lead connected to the first output conductor of said circuit, a second input lead connected to the second output conductor of said circuit and first and second output leads; and a signal source conditioning said gating device for signal passage.

21. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and energizing said second output conductor; means connected to said input conductors responsive to stimuli on each of said input conductors securing energization of said first output conductor; a gating device conditionally passing stimuli comprising a first input lead connected to the first output conductor of said circuit, a second input lead connected to the second output conductor of said circuit and first and second output leads; a signal source conditioning said gating device for signal passage; and a connection between an output lead of said gating device and the third input conductor of said circuit.

22. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and energizing said second output conductor; means connected to said input conductors responsive to stimuli on each of said input conductors securing energization of said first output conductor; a gating device conditionally passing stimuli comprising a first input lead connected to the first output conductor of said circuit, a second input lead connected to the second output conductor of said circuit and first and second output leads; a signal source conditioning said gating device for signal passage; and a delay element having an input lead connected with an output lead of said gating device and an output lead.

23. In a signal responsive network; a circuit comprising first, second and third input conductors adapted to receive stimuli, and first and second output conductors; means connected to said input conductors responsive to occurrence of stimuli singly on one of said input conductors energizing said first output conductor; means connected to said input conductors responsive to occurrence of stimuli upon any two of said input conductors inhibiting energization of said first output conductor by said first means and energizing said second output conductor; means connected to said input conductors responsive to stimuli on each of said input conductors securing energization of said first output conductor; a gating device conditionally passing stimuli comprising a first input lead connected to the first output conductor of said circuit, a second input lead connected to the second output conductor of said circuit and first and second output leads; a signal source conditioning said gating device for signal passage; a delay element having an input lead connected with an output lead of said gating device and an output lead; and a connection between the output lead of said delay element and the third input conductor of said circuit.

JOHN PRESPER ECKERT, Jr.
JOHN W. MAUCHLY.

References Cited in the file of this patent

UNITED STATES PATENTS

| Number | Name | Date |
| --- | --- | --- |
| 2,464,353 | Smith et al. | Mar. 15, 1949 |
| 2,563,589 | Hertog | Aug. 7, 1951 |
| 2,570,716 | Rochester | Oct. 9, 1951 |

OTHER REFERENCES

Article: "Digital Computer Switching Circuits," by C. H. Page; from "Electronics" for September 1948, pages 110–118.